Dec. 21, 1965     F. P. SPERL     3,224,625
RELISH TRAY OR THE LIKE
Filed July 16, 1963
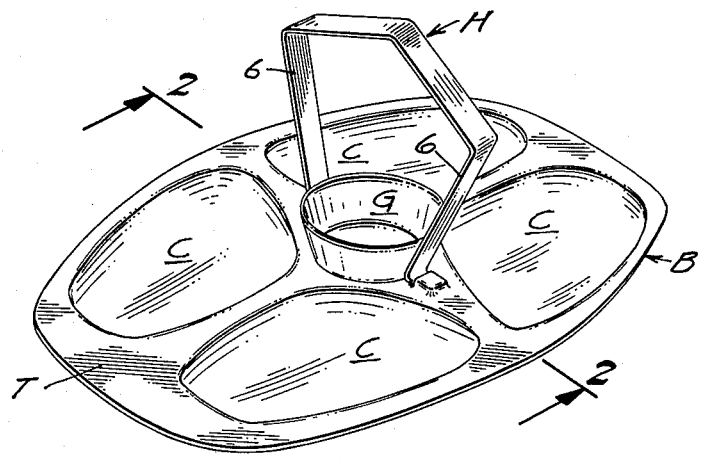
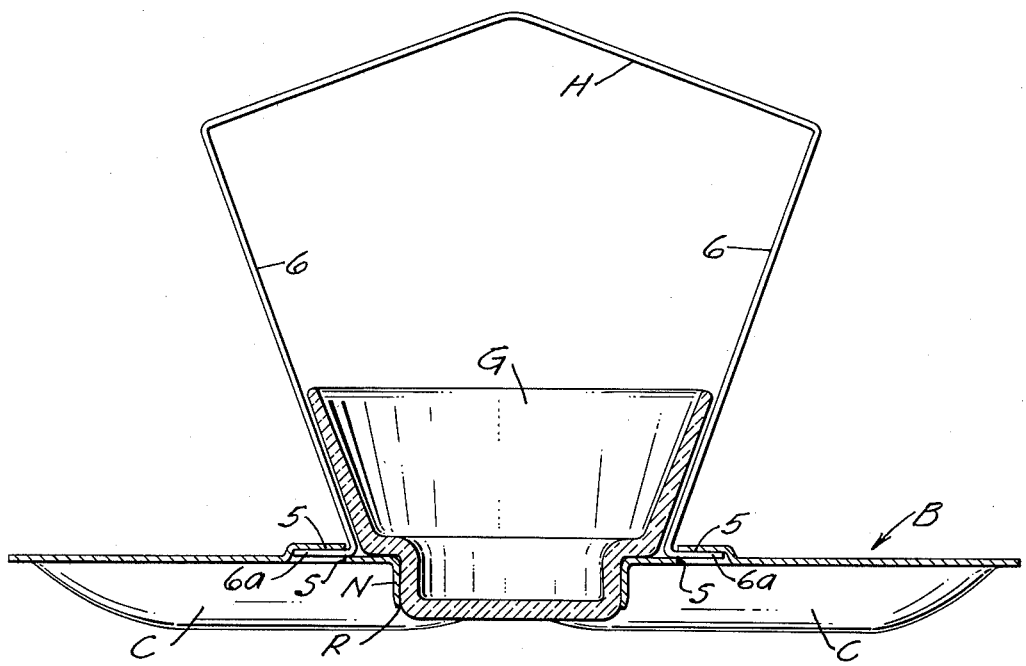
INVENTOR.
FERDINAND P. SPERL
BY
Williamson & Palmatier
ATTORNEYS

United States Patent Office 3,224,625
Patented Dec. 21, 1965

3,224,625
RELISH TRAY OR THE LIKE
Ferdinand P. Sperl, Peoria, Ill., assignor to Service Ideas, Inc., Minneapolis, Minn., a corporation of Minnesota
Filed July 16, 1963, Ser. No. 295,421
2 Claims. (Cl. 220—23.83)

This invention relates to a multi-compartment utensil or receptacle for containing and carrying a number of isolated materials or articles.

My improved structure, while by no means limited to, is particularly adapted for a highly ornate and servicable relish tray of the type adapted to contain a number of different relishes, hors d'oeuvres sauces, etc., and to facilitate passing of such tray and carrying thereof by a restaurant employee.

It is an object of my invention to provide a highly simplified receptacle of the type described, having a multi-compartment body capable of very economical manufacture, which comprises and is formed into a plurality of basin-like compartments for holding in isolated relation such materials as various foods or other articles, and which in its inherent structure, also includes a pair of opposed retaining sockets in combination with a resilient bail-type handle which has laterally extending feet for engagement and retention in said sockets, and in further combination with a means preferably having the dual function as a receptacle for preventing accidental withdrawal of the retaining feet of said handle.

A further object is the provision of a highly ornate, useful multi-compartment receptacle of the type described, particularly well adapted to be manufactured for the most part from a single sheet of somewhat ductile metal such as stainless steel or copper and constructed to permit the main body thereof to be integrally formed by draw and severing of the metal sheet to form a plurality of adjacent isolated basin-like compartments with a central recess for receiving an independent central receptacle such as a glass or the like, and also inherently through slitting and formation of portions adjacent said recess portion for attachment of a readily detachable spring handle by which the device may be conveniently carried or passed in restaurant or domestic use.

A still further object is the provision of a multi-compartment receptacle of the class described with upstanding detachable handle which may be readily dismantled for dishwashing or sterilization and/or for compact shipment and storage.

These and other objects and advantages of my invention will more readily appear from the following description made in connection with the accompanying drawings wherein like reference characters refer to the same or similar parts throughout the several views, and in which:

FIG. 1 is a top perspective view showing an embodiment of the invention assembled and ready for use; and FIG. 2 is a transverse vertical cross section taken on the line 2—2 of FIG. 1.

Referring now to the embodiment illustrated, it will be understood that the body indicated as an entirety by the letter B of my utensil may be constructed of other rigid molded material such as various reinforced plastics. In the form disclosed the body is die formed from a flat sheet of metal such as stainless steel, copper or aluminum having adequate ductility to permit "draw" of such material to form the various contours and shapes hereinafter described.

The body B of substantially rigid construction is die formed or molded to constitute a plurality, as shown four, basin-like or dished isolated compartments C, leaving a flat planar top T to the body.

In the formation of the integral body B, a central circular aperture or recess R is cut in the material and the stock of the material surrounding said recess is drawn downwardly and tubularly formed to constitute a receiving neck N, as clearly shown in FIG. 2.

Preferably simultaneously to aperturing the central part of the body through the planar top T to form recess R, two slits or cuts S are formed in the material of the planar top adjacent to the tubular sleeve N and on opposite sides thereof, removed a slight distance from the tubular neck portion N. Forming dies or the equivalent in the shaping of the body upset the material adjacent the slits S to form shallow rectangular sockets 5 for the reception and securing of the attachment feet of a detachable handle, indicated as an entirety by the letter H. The sockets 5 as shown are open ended at their inner extremities, are of rectangular formation and are closed at the outer ends thereof, extending diametrically and radially outward from the tubular neck portion N which surrounds the recess R.

The handle H is constructed from a suitable resilient spring metal and is of general bail shape formation, having from the top downwardly, inwardly converging elongated legs 6 which terminate at the lower ends thereof in out-turned attachment feet 6a, which are preferably tapered along their longitudinal edges adjacent the extremities thereof to nicely interfit with and be seated in the sockets 5. The handle H and legs 6 are so shaped that when attachment of the handle is made, the legs 6 are brought together and the metal tensioned, whereby the feet 6a may be readily positioned and received by sockets 5 and the legs and handle then released to apply outward tension on the legs, urging the handle into a retained position.

My structure preferably further includes another element or component having a dual function in that it constitutes an open top receptacle or glass, centrally disposed of the body B, and also comprising a peripheral abutment element to prevent retraction and disconnection of the legs of the handle through an abutting or substantially abutting relationship. The component or receptacle referred to may be of transparent glass, indicated as an entirety by the letter G, having an open top and truncated conical, peripheral circular wall which is of a diameter to be closely and snugly related with the inner sides of the legs 6 to prevent inward retraction of the legs, which would tend to release the attachment feet 6a from sockets 5.

The receptacle or glass 6 has a lower cylindrical portion 7 which is, in operation, frictionally and tightly secured within the neck N of the integral body and thus quite rigidly connected with the body, by application of pressure downwardly to the receptacle G.

In assembling the handle, body and receptacle G, the handle is first compressed for tensioning the legs 6 and the feet 6a thereof seated in the diametrically opposite sockets 5a of the body. The legs are then released and the handle is retained. Thereafter, the receptacle or glass G may be applied to the recessed portion centrally of the body, frictionally engaging the neck N and then affixed thereto. The assembled parts will then have the relationship as shown in FIGS. 1 and 2 of the drawings.

In use, various food materials or articles may be separately contained in the individual basin-like compartments C. In use as a relish tray such food materials as relishes, sauces, hors d'oeuvres, spreads or condiments may be disposed in the shallow compartments C. The receptacle G may contain ice with relishes such as celery, carrot sticks, onions and the like, and will present an ornamental and pleasing appearance disposed centrally of the several compartments C.

The tray or utensil may be readily carried by the centrally disposed handle H, from table to table or from kitchen to table, or may be passed by the diners from place to place at a table.

It will be obvious that the receptacle or glass G may be readily removed by forcing the same upwardly from the neck N, whereafter the handle H may be readily removed by pressing the legs 6 slightly inwardly to release the attachment feet 6a from sockets 5. Thereafter, all of the parts may be readily washed and sterilized in conventional dishwashers or otherwise.

The detachment of the three parts of my utensil enables the entire device to be disposed in compact form, the handle H resting against the planar face of the top T, which is useful for economical shipment, storage and commercial sales of a package construction.

It will further be noted that a plurality of the bodies B may be quite compactly nested in restaurant use.

It will of course be understood that various changes may be made in the form, details, and arrangement of parts without departing from the scope of my invention.

What is claimed is:

1. A portable utensil such as a relish tray having in combination, an integral body drawn and formed from a somewhat ductile metal material to constitute a plurality of separated, dished compartments with a substantially planar top having a central portion intermediate of said compartments, said central portion being recessed with the metal drawn downwardly about said recess to form a tubular reception neck, a readily detachable handle of general bail shape constructed of resilient material, said body on opposed sides of said neck being integrally formed by slitting and bulging material outwardly of such slits to define a pair of open-ended shallow sockets extending radially outward with respect to said neck, said handle having attachment feet extending outwardly and laterally of the legs thereof, shaped to be readily inserted into said sockets when tension is placed upon the legs of said handle, thereby to operatively interconnect said handle in an upstanding relation to said body, and a circular receptacle having a lower end frictionally and snugly fitting within the neck of said body and having a peripheral wall, the sides of said peripheral wall being disposed in close relation to the inner sides of the legs of the handle to prevent accidental retraction and disconnection thereof.

2. A portable utensil such as a relish tray having in combination, a body formed into a plurality of separated, dished compartments with a substantially planar top having a central portion intermediate of said compartments, said central portion having a depending skirt defining with said top, an opening, a readily detachable handle of general bail-shape, constructed of resilient material, said body, on opposed sides of said depending flange, having opposed retaining slots to provide shallow sockets for connection with said handle, said handle having attachment feet extending outwardly relatively to the legs thereof and dimensioned to be readily inserted into said sockets when said legs are drawn together, tensioned and subsequently released to operatively interconnect said handle in an upstanding relation to said body, a receptacle having a lower end fitting within said depending skirt of the body and having an upper peripheral wall of larger cross sectional area than said lower end, said peripheral wall being disposed in close relation to the inner sides of the legs of said handle to prevent accidental retraction and disconnection thereof in use.

References Cited by the Examiner
UNITED STATES PATENTS

| | | | |
|---|---|---|---|
| 1,705,236 | 3/1929 | Buckley | 220—103 |
| 2,210,521 | 8/1940 | Bemis | 220—23.83 |
| 2,291,936 | 8/1942 | Zabel | 220—94 |

THERON E. CONDON, *Primary Examiner.*

GEORGE E. LOWRANCE, *Examiner.*